(12) United States Patent
Kopelman et al.

(10) Patent No.: US 7,978,700 B2
(45) Date of Patent: Jul. 12, 2011

(54) APPARATUS FOR DETERMINING LOCATIONS OF FIELDS IN A DATA UNIT

(75) Inventors: Yaniv Kopelman, Mishmeret (IL); Aviran Kadosh, Misgav (IL)

(73) Assignee: Marvell Israel (MISL) Ltd., Yokneam (IL)

( * ) Notice: Subject to any disclaimer, the term of this patent is extended or adjusted under 35 U.S.C. 154(b) by 433 days.

(21) Appl. No.: 12/047,063

(22) Filed: Mar. 12, 2008

(65) Prior Publication Data

US 2008/0232374 A1    Sep. 25, 2008

Related U.S. Application Data

(60) Provisional application No. 60/894,327, filed on Mar. 12, 2007, provisional application No. 60/910,336, filed on Apr. 5, 2007.

(51) Int. Cl.
  *H04L 12/28* (2006.01)
(52) U.S. Cl. ........................................... 370/392
(58) Field of Classification Search ........................ None
  See application file for complete search history.

(56) References Cited

U.S. PATENT DOCUMENTS

| 6,304,903 | B1 * | 10/2001 | Ward ........................... 709/224 |
| 7,212,531 | B1 | 5/2007 | Kopelman et al. |
| 2002/0163909 | A1 * | 11/2002 | Sarkinen et al. ............. 370/386 |
| 2005/0141513 | A1 * | 6/2005 | Oh et al. .................... 370/395.3 |

OTHER PUBLICATIONS

Pagiamtzis et al. "Content-Addressable Memory (CAM) Circuits and Architectures: A Tutorial and Survey," *IEEE Journal of Solid-State Circuits*, vol. 31, No. 3, pp. 712-727, Mar. 2006.

* cited by examiner

*Primary Examiner* — Chirag G Shah
*Assistant Examiner* — Otis L Thompson, Jr.

(57) ABSTRACT

A header analyzer unit generates attribute information regarding headers of a data unit. The header analyzer unit includes a programmable memory unit having a content addressable memory (CAM) with an input to receive a first portion of the data unit and a second portion of the data unit. The programmable memory unit also includes a memory separate from the CAM and coupled to an output of the CAM. The CAM stores indications of locations within the memory separate from the CAM, and the memory separate from the CAM programmably stores header attribute information regarding a plurality of different types of headers for data units having different formats.

14 Claims, 11 Drawing Sheets

PRIOR ART

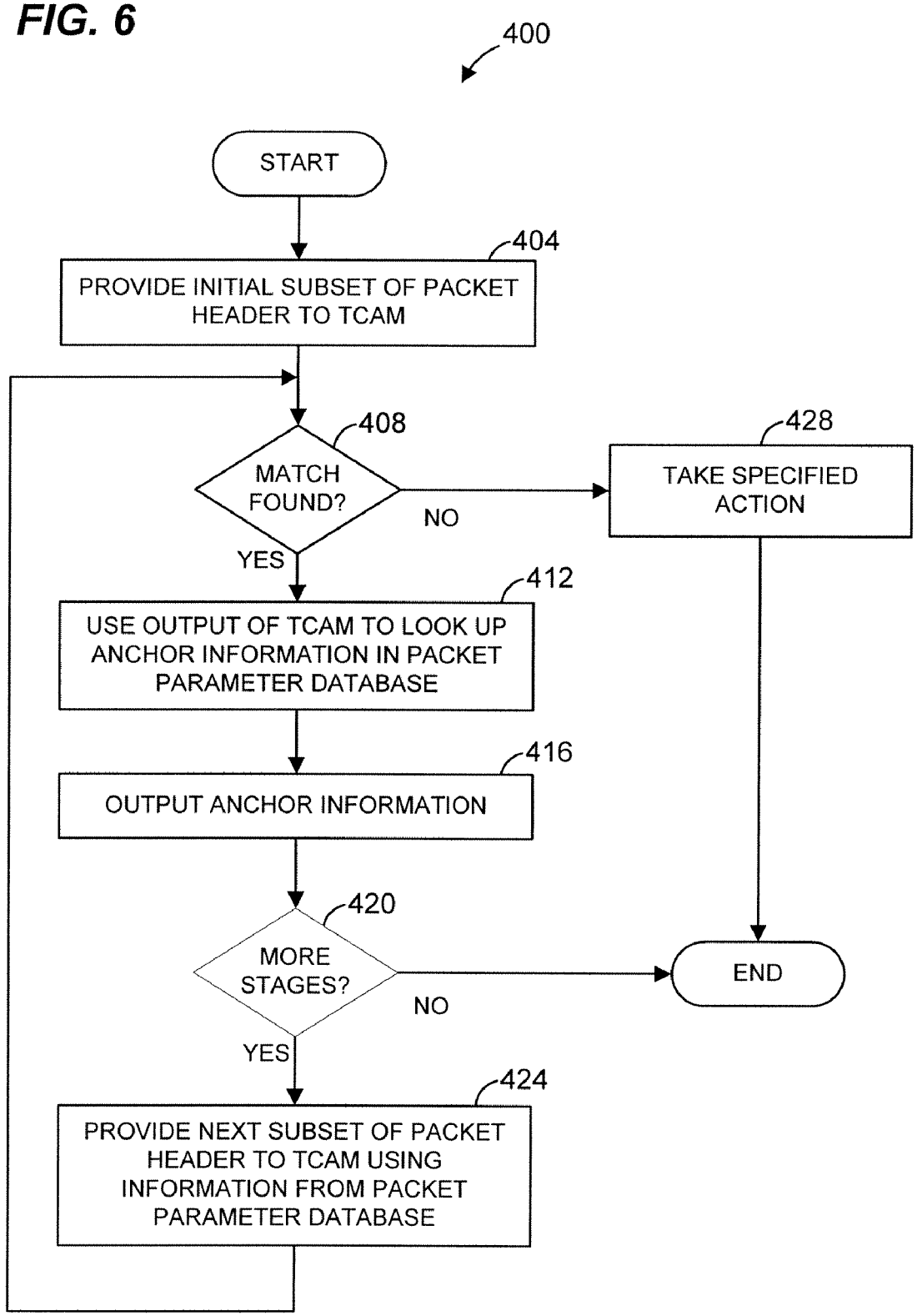

*FIG. 7A*

| | Branch 1 | Branch 2 | Branch 3 |
|---|---|---|---|
| L5 | 3 \| Ripv1 \| Ripv2 \| Other | | 4 \| ICMP \| IGMPv1 \| IGMPv2 \| IGMPv3 |
| | 2 2 | | |
| L4 | 1 \| UDP | 2 \| TCP \| Other | |
| | 8 | 24 | |
| L3 | 5 \| IPv4 \| IPv6 \| GRE \| IPv4+O \| IPv6+Ext | 5 \| IPv4 \| IPv6 \| GRE \| IPv4+O \| IPv6+Ext | 2 \| IPv4 \| IPv4+O |
| | 20 40 8 | | |
| T | 3 \| IPv4 \| IPv6 \| Eth | 3 \| IPv4 \| IPv6 \| Eth | 3 \| IPv4 \| IPv6 \| Eth |
| | 20 40 14 | | |
| L2+ | 4 \| MPLS \| MPLS2 \| MPLS3 \| None | 4 \| MPLS \| MPLS2 \| MPLS3 \| None | 4 \| MPLS \| MPLS2 \| MPLS3 \| None |
| | 4 8 12 0 | | |
| L2 | 4 \| V2 \| LLC \| LLC/SNAP \| Other | 4 \| V2 \| LLC \| LLC/SNAP \| Other | 4 \| V2 \| LLC \| LLC/SNAP \| Other |
| | 14 28 22 4 | | |
| L2- | 3 \| Untag \| tag \| tag2 | 3 \| Untag \| tag \| tag2 | 3 \| Untag \| tag \| tag2 |
| | 0 2 4 | | |

FIG. 7B

| Branch 4 | Branch 5 |
|---|---|
| 2 ICMP6  MLD | |
| 2 IPv6  IPv6+Ext | 1 Other |
| 3 IPv4  IPv6  Eth | 3 IPv4  IPv6  Eth |
| 4 MPLS  MPLS2  MPLS3  None | 4 MPLS  MPLS2  MPLS3  None |
| 4 V2  LLC  LLC/SNAP  Other | 4 V2  LLC  LLC/SNAP  Other |
| 3 Untag  tag  tag2 | 3 Untag  tag  tag2 |

APPARATUS FOR DETERMINING LOCATIONS OF FIELDS IN A DATA UNIT

CROSS-REFERENCES TO RELATED APPLICATIONS

The present application claims the benefit of U.S. Provisional Application No. 60/894,327, entitled "PACKET HEADER ANALYZER," filed on Mar. 12, 2007, which is hereby incorporated by reference herein in its entirety.

The present application also claims the benefit of U.S. Provisional Application No. 60/910,336, entitled "GENERIC HEADER ANALYZER FOR PUMA2," filed on Apr. 5, 2007, which is hereby incorporated by reference herein in its entirety.

BACKGROUND

In communication systems and storage systems, data is typically stored in units such as messages, packets, etc. For instance, communication systems often send data encapsulated in packets. Also, network communication systems often utilize layered communication protocols, such as protocols having a structure similar to the Open Systems Interconnection (OSI) seven layer model. In such communication protocols, at least some of the layers may receive a data unit from the adjacent upper layer and create a new data unit that includes layer-specific information (which may be referred to as a "header" or a "trailer") appended to the received data unit. For example, the third layer may receive a fourth layer data unit and create a third layer data unit by appending a third layer header to the fourth layer data unit. Similarly, the second layer may receive the third layer data unit and create a second layer data unit by appending a second layer header to the third layer data unit. Eventually, a packet is created for sending over the communications network, and this packet may include headers from several different layers.

The OSI seven layer model includes a physical layer, a data link layer, a network layer, a transport layer, a session layer, a presentation layer, and an application layer. The physical layer is the lowest layer, and handles electrical and physical interaction with a communication medium. The next layer up is the data link layer. The data link layer provides functional and procedural means to transfer data between network entities and to detect and possibly correct errors that may occur in the physical layer. The third layer is the network layer. This layer provides functional and procedural means of transferring variable length data sequences from a source to a destination via one or more networks while maintaining the quality of service requested by a transport layer, which is above the network layer. The fourth layer, the transport layer, provides transparent transfer of data between end users, providing reliable data transfer services to the upper layers. The transport layer may utilize flow control, segmentation/desegmentation, and error control. Some transport layers may keep track of the segments and retransmit those that fail. The session layer controls the dialogues/connections (sessions) between computers. It establishes, manages and terminates the connections between the local and remote application. The presentation layer establishes a context between application layer entities. The presentation layer data units may perform transformations on the data received from an upper layer (examples of such transformations include MPEG compression of video data, encryption of MIME messages, etc.). The application layer interfaces directly to and performs common application services for the application processes.

FIG. 1 is an illustration of an example packet 100 as it may appear on a communication medium of a network. The packet 100 may include an application layer unit including a message 102 and an application layer header 104. The application layer unit may be included within a presentation layer unit that further includes a presentation layer header 108. Similarly, the packet 100 may include multiple nested data units corresponding the various layers in the protocol. As a result, the packet 100 may include multiple headers such as the application layer header 104, the presentation layer header 108, a session layer header 112, a transport layer header 116, a network layer header 120, and a data link layer header 124.

As another example, multiprotocol label switching (MPLS) is a communication protocol for fast packet switching and routing. In the context of the OSI seven layer model, MPLS may be thought of as operating between the second layer, the data link layer, and the third layer, the network layer.

When a data unit, such as the packet 100, is received by a communication device on a network, different processes, modules, etc., may need to operate on different portions of the data unit. For example, with the packet 100, a data link layer process may need to analyze the data link layer header 124, but may ignore the other headers. On the other hand, a transport layer process may need to analyze the transport layer header 116, but may ignore the data link layer header 124, for example. Thus, it is often desirable to parse a received data unit, such as the packet 100, to provide different portions of the data unit to different processes, modules, etc.

With packets, a packet processor is typically used to parse the packet. The parsing of packet data is typically divided into two tasks: analyzing the packet structure and parsing relevant fields based on the packet analysis. Packet analysis requires a previous knowledge of all possible packet types. Currently, organizations such as the Institute of Electrical and Electronics Engineers (IEEE) define packet types and formats. Thus, packet analysis may use such definitions to analyze a packet. The result of packet analysis may include the locations of different headers in the packet. It may also include identification of the protocol that corresponds to each header. This information may be provided to a packet parser which then uses the information to parse the packet.

SUMMARY OF THE DISCLOSURE

In one embodiment, a method includes providing at least a portion of a data unit to a programmable memory unit to identify an attribute of a field in a header of the data unit, and parsing the header in response to an output of the programmable memory unit.

In another embodiment, an apparatus includes a header analyzer unit configured to generate attribute information regarding headers of a data unit, the generated header attribute information for use in parsing the data unit. The header analyzer unit comprises a programmable memory unit having an input to receive at least a first portion of the data unit, wherein the programmable memory unit stores header attribute information regarding a plurality of different types of headers.

In yet another embodiment, a method comprises providing a packet header to a first packet header analyzer. The method also comprises parsing the packet header based on the attribute information for fields in the packet header generated by the first packet header analyzer if the first packet header analyzer is able to generate attribute information for fields in the packet header. The method additionally comprises providing at least a portion of a packet header to an input of a programmable memory unit of a second packet header analyzer to generate attribute information for fields in the packet header. Further, the method comprises parsing the packet header based on the attribute information for fields in the packet header generated by the second packet header analyzer if the first packet header analyzer is unable to generate indications of locations of fields in the packet header.

In still another embodiment, an apparatus includes a first packet header analyzer, and a second packet header analyzer. The second packet header analyzer includes a programmable memory unit having an input to receive at least a first portion of a packet header. The programmable memory unit stores attribute information regarding packet headers having different formats.

BRIEF DESCRIPTION OF THE DRAWINGS

FIG. 6 is a flow diagram of another example method for analyzing a packet header;
FIGS. 7A and 7B illustrate an example 5-branch search tree for analyzing a packet header.

DETAILED DESCRIPTION

Figure 1:
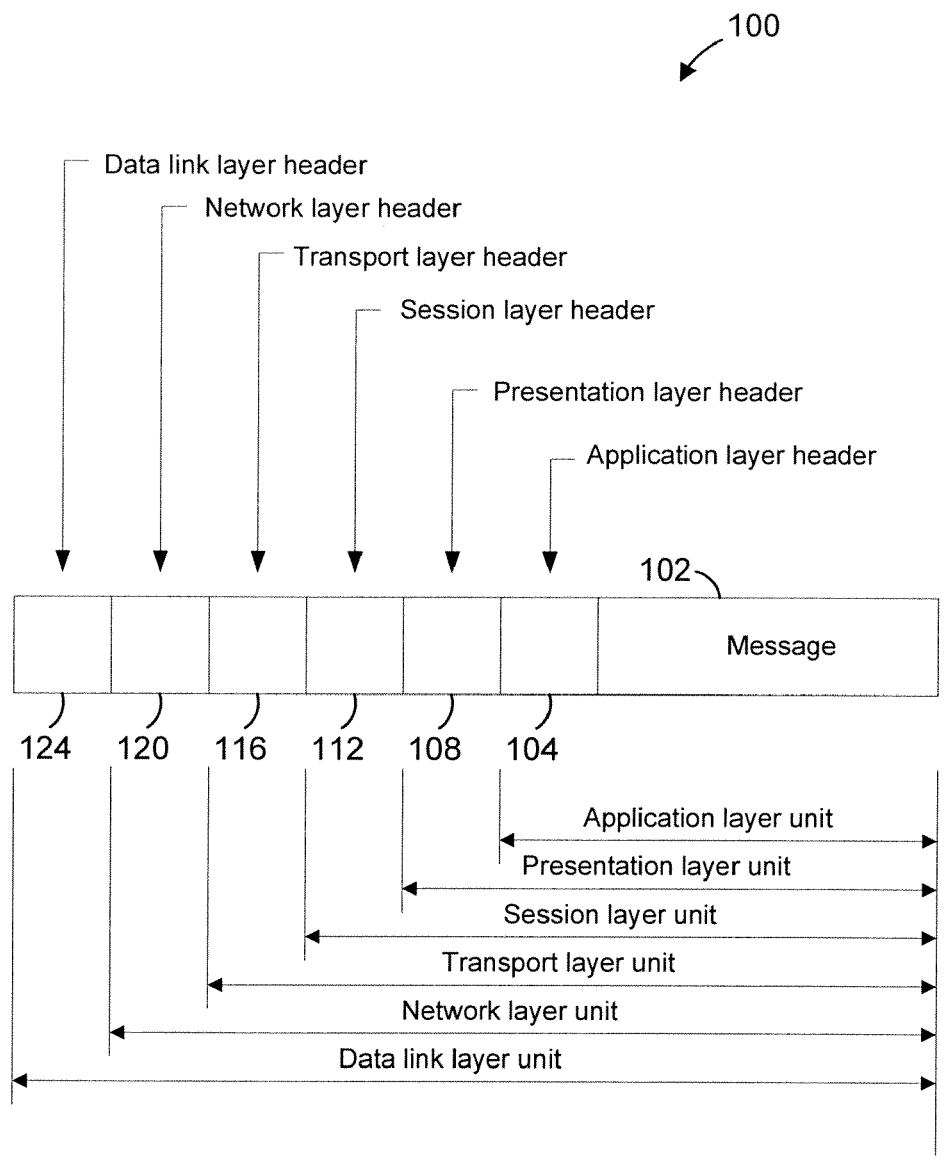
FIG. 1 is an illustration of example packet.
Figure 2:
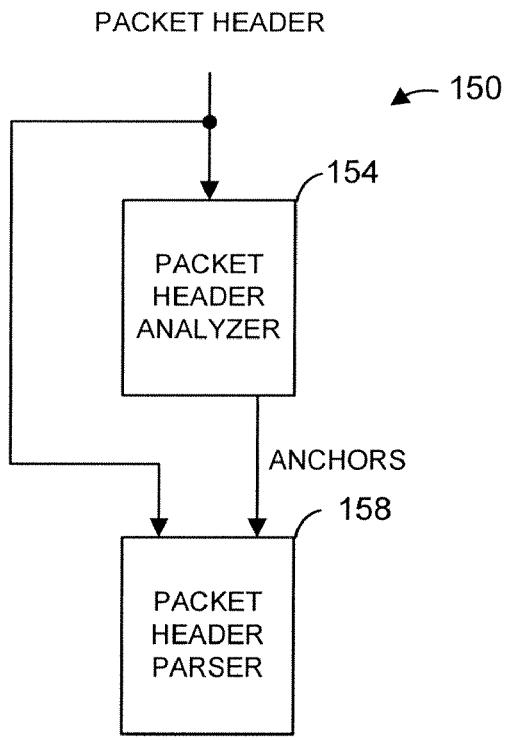
FIG. 2 is a block diagram of an example packet processor.

FIG. 2 is a block diagram of an example packet processor 150 for parsing a packet or a portion of a packet. The packet or portion of the packet to be parsed may be received via a transmission over a point-to-point communication link, a network such as a wired local area network (LAN), a wireless LAN, a wide area network (WAN), a broadband wireless network, a cellular network, etc.

The packet processor 150 includes a packet header analyzer 154 communicatively coupled to a packet header parser 158. The packet header analyzer 154 may receive a packet or a portion of a packet (e.g., a packet header portion) and analyze the packet (or portion) to determine attribute information regarding one or more fields within the packet (or portion). For ease of explanation, the detailed description may hereinafter refer to "a packet", but it is to be understood that such a reference may also refer to only a portion of a packet. Also, as used hereinafter, the term "header" is intended to refer to both "headers" and "trailers" for ease of explanation. The fields may correspond to headers associated with various communication protocols and/or layers within a communication protocol. For example, a packet may include layer 2 and layer 3 headers, and the packet header analyzer 154 may determine attributes of these headers (i.e., attribute information). The attribute information may include indicators of the locations of the headers within the packet, and such indicators may be referred to as anchors. An anchor may be an offset from the beginning of the packet or from some other reference point, such as the beginning of a packet portion being analyzed, another header, etc. The attribute information may include, additionally or alternatively, other information as well such as an indicator of whether a header is valid or whether information within the header is valid, an indicator of a priority of the packet, a number of MPLS labels, a number of 802.1Q tags, a number of virtual LAN (VLAN) tags, etc. Embodiments are described below in which the packet header analyzer 154 determines the locations of one or more fields within a packet. It is to be understood, however, that in other embodiments, a packet header analyzer may determine other attribute information in addition to or as an alternative to location information, such as an indicator of whether a header is valid or whether information within the header is valid, an indicator of a priority of the packet, information regarding a number of tags or labels associated with a protocol header, etc. For example, in one embodiment, a packet header analyzer may determine information regarding a number of tags or labels associated with a protocol header. The packet header parser 158 may then utilize this information to parse the packet header. The information regarding the number of tags or labels associated with a protocol header may include, for instance, a number of VLAN tags, a number of 802.1Q tags, a number of MPLS labels, etc.

The anchors generated by packet header analyzer 154 may be provided to the packet header parser 158. The packet header parser 158 utilizes the anchors to parse the packet header. For example, headers corresponding to the anchors may be parsed to appropriate processes, modules, etc. More generally, the packet header analyzer 154 may generate anchor information that includes the anchors that indicate the locations of fields, as well as other information associated with the anchors, such as indicators of the protocols to which the fields correspond, whether an anchor information entry is valid, etc.

Figure 3:
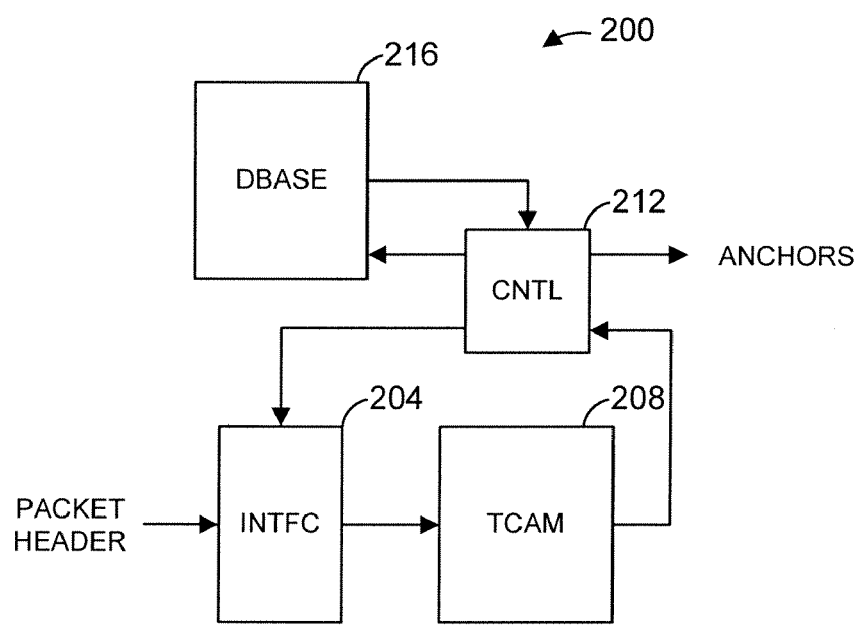
FIG. 3 is a block diagram of an example packet header analyzer that may be utilized in the packet processor of FIG. 2.

FIG. 3 is a block diagram of an example packet header analyzer 200 that could be utilized in the packet processor 150 of FIG. 2. Of course, the packet processor 150 could utilize a packet header analyzer different than the packet header analyzer 200. Similarly, the packet header analyzer 200 of FIG. 3 could be used in systems other than the packet processor 150.

In the example packet header analyzer 200 of FIG. 2, the packet header information may be provided to an interface 204 that provides portions of the packet header information to an input of a ternary content addressable memory (TCAM) 208. The TCAM 208 may have stored therein known patterns that correspond to various types of headers. In other embodiments, the TCAM 208 may be replaced with a CAM or some other suitable programmable memory unit. The TCAM 208 compares the output of the interface 204 with the stored patterns and generates an index at its output when it determines a match. The index indicates which pattern in the TCAM 208 was matched. The output of the TCAM 208 may be coupled to a controller 212. The controller 212 may be coupled to the interface 204 and may generate control information for controlling the interface 204. The control information may indicate, for example, which portion of the packet header information should be provided to the TCAM 208. If the TCAM 208 does not detect a match it may indicate this to the controller 212.

The packet header analyzer 200 may also include a database 216, which may be a memory device such as a random access memory (RAM), a FLASH memory, etc. In one particular implementation, the database 216 may include a static RAM. The database 216 may include information associated with the data patterns stored in the TCAM 208, and the output of the TCAM 208 may correspond to a location in the database 216 (i.e., the output of the TCAM 208 may indicate an index into the database 216). The output of the TCAM 208 may be an index into the database 216 or it may be an argument to a function that generates the index into the database 216. For example, for each of at least some patterns in the TCAM 208, the database 216 may include data indicating which portion of the packet should next be analyzed (e.g., by providing it as an input to the TCAM 208). As another example, for each of at least some patterns in the TCAM 208, the database 216 may include anchor information (e.g., data indicating locations of fields in the packet, data indicating the protocols to which the fields correspond, etc.).

The controller 212 may be coupled to the database 216, and may use the output of the TCAM 208 to retrieve data from the database 216. For instance, the output of the TCAM 208 may provide or indicate an index into the database 216, and the controller 212 may utilize the index to retrieve data from the database 212. For example, the controller 212 may retrieve information from the database 216 that is used to control the interface 204 to provide a different portion of the packet header information to the TCAM 208. As another example, the controller 212 may retrieve anchor information that may be provided to a packet parser.

In operation, the interface 204 may receive packet header information. The interface 204 may comprise multiplexer and/or arbitration circuitry to provide a particular portion of packet header data to the TCAM 208. Optionally, the interface 204 may include storage and may act as a buffer storing the packet header information. In one implementation, the interface 204 may include a storage element adapted to perform a shift operation. By shifting data in the storage element, a particular portion of the packet header information may be provided to the TCAM 208.

The controller 212 may control the interface 204 to provide a portion of the packet header information to the TCAM 208. For example, after receiving new packet header information, the controller 212 may control the interface 204 to provide an initial portion of the packet header information to the TCAM 208. Then, if the TCAM 208 indicates a match, the controller 212 may retrieve anchor information from the database 216 corresponding to the initial portion of the packet. The retrieved anchor information also may indicate which next portion of the packet header information should be analyzed by the TCAM 208. Optionally, the controller 212 may retrieve separate information from the database 216 that indicates which next portion of the packet header information should be analyzed by the TCAM 208.

The controller 212 may then control the interface 204 based on this retrieved information so that the next portion of the packet header information is supplied to the TCAM 208. For example, in implementations in which the interface 204 includes a shiftable storage element, the controller 212 may cause the interface 204 to shift the packet header information so that the next portion is supplied to the TCAM 208.

Optionally, this process may be repeated one or more times so that one or more different portions of the packet header information are supplied to the TCAM 208. Eventually, the controller 212 may retrieve from the database 212, based on an output of the TCAM 208, anchor information indicating where in the packet header information various fields are located. In this way, the packet header analyzer 200 may utilize a multi-step analysis of the packet header information to generate anchor information. As discussed above, in other embodiments, a packet header analyzer may determine other attribute information in addition to or as an alternative to anchor information, such as an indicator of whether a header is valid or whether information within the header is valid, an indicator of a priority of the packet, information regarding a number of tags or labels associated with a protocol header, etc. For example, in one embodiment, a packet header analyzer may determine information regarding a number of tags or labels associated with a protocol header. The information regarding the number of tags or labels associated with a protocol header may include, for instance, a number of VLAN tags, a number of 802.1Q tags, a number of MPLS labels, etc.

In an alternative implementation, only a single-step analysis may be utilized. In this implementation, packet header information is provided to the TCAM 208. If there is a match, the controller 212 may retrieve anchor information from the database 216 based on the output of the TCAM 208. In this implementation, the controller 212 need not generate control information for controlling which portion of the packet header information is provided to the input of the TCAM 208. In such implementations, the controller 212 optionally need not be coupled to the interface 204 or the interface 204 optionally may be omitted.

Figure 4:
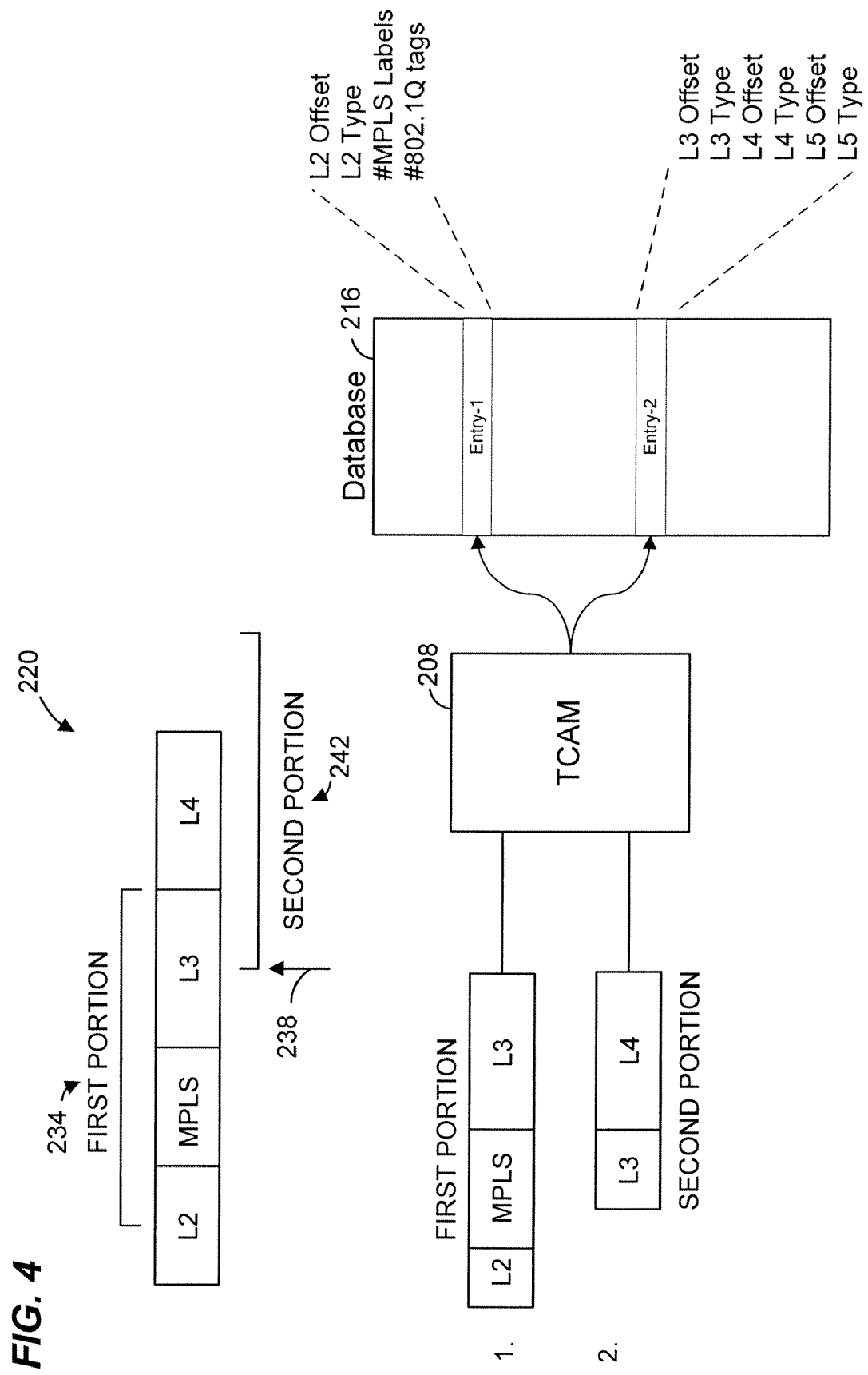
FIG. 4 is a functional illustration of the packet header analyzer of FIG. 3.

FIG. 4 is a functional illustration of the packet header analyzer 200 of FIG. 3. In FIG. 4, the packet header analyzer 200 is utilized in a two-step analysis of packet header information 220. Of course, in some implementations, a multi-step analysis may include three or more steps. In the example of FIG. 4, the packet header information includes a layer 2 (L2) header field (e.g., an Ethernet header field), a multiprotocol label switching (MPLS) header field, a layer 3 (L3) header field (e.g., an Internet Protocol (IP) header field), and a layer 4 header field (e.g., a TCP header field). As will be described below, two 64-byte portions of the packet header information 220 are analyzed. Of course, in other implementations, portions of sizes other than 64-bytes may be analyzed. Moreover, the two portions may be different sizes.

In a first step of the analysis, a first portion 234 of the packet header information is provided to the TCAM 208. In the illustration of FIG. 4, the TCAM 208 includes data that matches the first portion of the packet header information, and the TCAM 208 generates an output corresponding to the match. This output may be a pointer, address, or other indicator of a corresponding entry in the database 216 ("Entry-1"). This entry may include, point to, or otherwise indicate information that identifies the second portion of the packet header information that should be provided next to the TCAM 208. For instance, the Entry-1 may include or indicate an offset 238 to the second portion. The offset 238 may be an offset from the beginning of the packet or packet header information, an offset from the beginning of the first portion, etc. Additionally, the Entry-1 may include anchor information regarding the first portion. In the illustration of FIG. 4, the Entry-1 includes anchor information regarding the L2 layer (e.g., L2 Offset), as well as information associated with an MPLS layer and 802.1Q tags. The offset 238 may be an offset in the anchor information (e.g., the L2 Offset). Alternatively, the offset 238 may be separate from the anchor information.

In a second step of the analysis, the offset 238 may be used to provide a second portion 242 as input to the TCAM 208. In the illustration of FIG. 4, the TCAM 208 includes data that matches the second portion of the packet header information, and the TCAM 208 generates an output corresponding to the match. This output may be a pointer, address, or other indicator of a corresponding entry in the database 216 ("Entry-2"). This entry may include, point to, or otherwise indicate anchor information that may include the locations of fields in the packet header information, the protocols to which the fields correspond, etc. The locations may be represented by offsets. For example, a location may be indicated by an offset from the start of the packet, an offset from a current search offset, an offset from another header, etc. In the illustration of FIG. 4, the Entry-2 includes anchor information regarding the L3, L4 and L5 layers.

In the above-described implementations, if the TCAM 208 does not find a match, the controller 212 may perform alternate actions such as generating an indicator and/or control information to cause the packet to be discarded, stored for further analysis, etc.

In the illustration of FIG. 4, the database 216 includes anchor information such as described above. Also, for multi-step analyses, the database 216 may include information indicative of the next portion of the packet header information that should be provided to the TCAM 208 in the next step of the analyses. Optionally, the database 216 may include other types of information such as whether particular anchor information is valid, information passed from a previous analyses step to help enable a lookup search tree (e.g., a lookup identifier (ID) that may indicate in which segment of the TCAM to perform the next search), information indicative of a command to be executed in connection with the packet (e.g., forward the packet to a particular processing unit, trap or store the packet for later analyses, drop the packet, etc.), a number of IEEE 802.1Q tags, an indicator of whether the number of IEEE 802.1Q tags entry is valid, a number of MPLS labels, an indicator of whether the number of MPLS labels entry is valid, etc. Regarding the lookup ID, the TCAM may comprise separately activatable segments, and the lookup ID may indicate in which segment to perform the next search (e.g., which segment should be activated).

Figure 5:
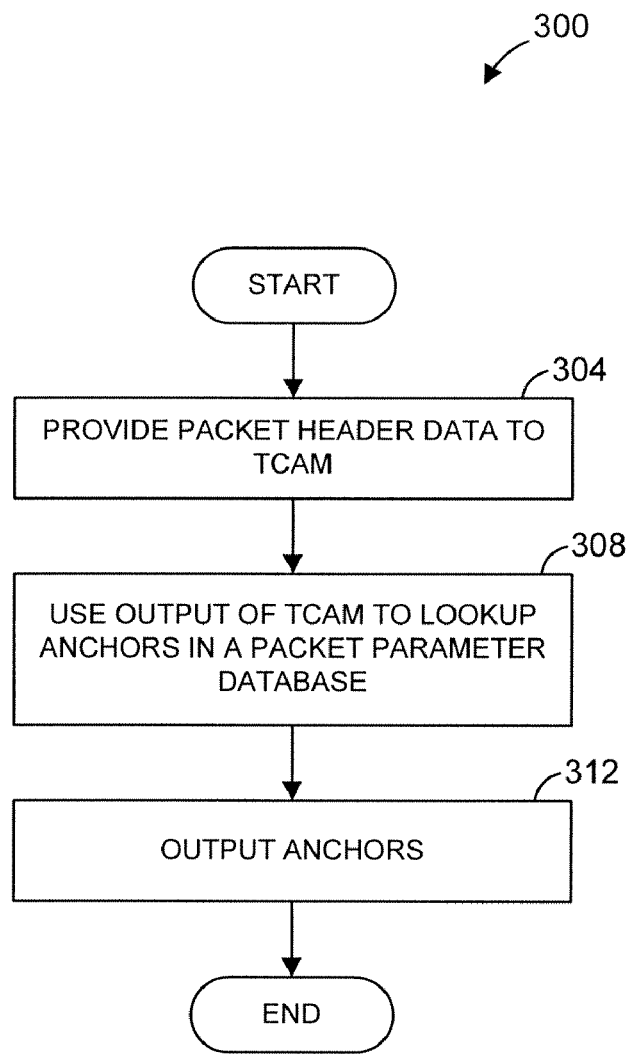
FIG. 5 is a flow diagram of an example method for analyzing a packet header.

FIG. 5 is a flow diagram of an example method 300 for generating anchor information, such as indications of the locations of fields of interest in the packet header. The method 300 may be implemented by a packet header analyzer such as the packet header analyzer 200 of FIG. 3, and will be discussed with reference to FIG. 3 for ease of explanation. It is to be understood, however, that the method 300 may be implemented by packet header analyzers different than the packet header analyzer 200 of FIG. 3.

At a block 304, packet header data is provided as an input to a TCAM. For example, as discussed above with reference to FIG. 3, packet header data may be provided to the TCAM 208 via the interface 204. At a block 308, outputs of the TCAM may be used to lookup anchor information in a packet parameter database. For example, with the packet header analyzer 200, outputs of the TCAM 208 provide indexes into the database 216. Using these indexes, the controller 212 may retrieve anchor information from the database 216.

The blocks 304 and 308 may be implemented as a single-stage lookup process or a multi-step lookup process. For example, in a multi-stage lookup process, a different portion of the packet header may be provided to the TCAM at each stage, and data retrieved from the packet parameter database may provide an indication of which portion of the packet header is to be provided to the TCAM in the next stage. For example, the controller 212 may control the interface 204 to control which subsets of the packet header information is provided to the TCAM 208.

At a block 312, anchor information retrieved from the packet parameter database is output. The outputted anchor information may be provided to a packet parser, for example. If the blocks 304 and 308 are implemented as a multi-stage lookup process, the anchor information may be output at each stage, or it may be output once all of the stages have been completed.

An example multi-stage implementation of the method 300 is illustrated in FIG. 6. FIG. 6 is a flow diagram of an example method 400 for generating anchor information, such as indications of the locations of fields of interest in the packet header. It is to be understood based on the teachings herein, however, that the method 300 may be implemented differently than in FIG. 6. The method 400 may be implemented by a packet header analyzer such as the packet header analyzer 200 of FIG. 3 for example, and will be discussed with reference to FIG. 3 for ease of explanation. It is to be understood, however, that the method 400 may be implemented by packet header analyzers different than the packet header analyzer 200 of FIG. 3.

At a block 404, an initial subset of the packet header may be provided to the TCAM. For example, as discussed above with reference to FIG. 3, an initial subset of the packet header may be provided to the TCAM 208 via the interface 204. If a match is found (block 408), the flow may proceed to a block 412, at which an output of the TCAM is utilized to look up anchor information from a packet parameter database. For example, with the packet header analyzer 200, outputs of the TCAM 208 provide indexes into the database 216. Using these indexes, the controller 212 may retrieve anchor information from the database 216. At a block 416, the anchor information may be output.

If there are more stages to be performed (block 420), information from the packet parameter database may be utilized to determine which next subset of the packet header should be provided to the TCAM, and the next subset may be provided to the TCAM at the block 424. For example, as discussed above with reference to FIG. 3, a location of a next subset of the packet header may be indicated by information retrieved from the packet parameter database 216 using the output of the TCAM 208. Then, the controller 212 may control the interface 204 to provide the next subset to the TCAM 208 via the interface 204. After the block 424, the flow may proceed back to the block 408. But if, at the block 420, it is determined that there are no more stages in the analysis, the flow may end.

At the block 408, if there is no match in the TCAM, the flow may proceed to a block 428, at which a specified action may be taken or initiated. For example, the controller 212 may cause the packet to be dropped, stored for later analysis, forwarded to particular processing unit, etc. The action taken optionally may depend on the stage of the multi-stage process and/or information stored in the packet parameter database. For example, if no match is found at the first stage of the analysis, a default action may be taken or initiated. If a match is not found at a stage after the first stage, the action taken or initiated may be determined by information stored in the packet parameter database. For example, at the first stage, information retrieved from the packet parameter database using the output of the TCAM may indicate what action should be taken if no match is found at a subsequent stage.

As described above, single-stage or multi-stage analyses may be implemented. Generally speaking, as the number of stages in an analysis increases, the number of entries required in the TCAM may tend to decrease. FIGS. 7A and 7B illustrate an example 5-branch search tree that may be implemented using apparatus and methods such as described above. Table 1 lists example numbers of TCAM entries that may be utilized for the example search of FIGS. 7A and 7B with different analyses having different numbers of stages. Table 1 also lists example key sizes for the different analyses. A key size may correspond to the size of the header subset provided to the TCAM. For example, a key size of 148 indicates that 148 bytes are provided to the TCAM during a stage of the analysis.

TABLE 1

TOTAL NUMBER OF TCAM ENTRIES

| KEY SIZE (Bytes) | NUMBER OF STAGES | TOTAL NUMBER OF TCAM ENTRIES |
|---|---|---|
| 148 | 1 | 5472 |
| 104 | 2 | 354 |
| 116 | 2 | 516 |
| 64 | 3 | 158 |
| 52 | 4 | 146 |

As can be seen in Table 1, the number of TCAM entries that are utilized generally decreases as the number of stages in the analyses increases. For example, for a single-stage implementation, over 5000 TCAM entries may be utilized, whereas for a four-stage implementation, only about 150 entries are utilized. As also can be seen in Table 1, the number of TCAM entries utilized may depend on the key size. For example, for a two-stage implementation with a key size of 104, about 350 TCAM entries are utilized, whereas with a key size of 116, about 500 TCAM entries are utilized. Thus, one of ordinary skill in the art will recognize that the key size, the number of stages in the analyses, and the number of TCAM entries, for example, may provide design tradeoffs. Tables 2-6 list how many TCAM entries each of the branches of FIGS. 7A and 7B contribute to the total TCAM entries listed in Table 1.

TABLE 2

NUMBER OF TCAM ENTRIES FOR BRANCH 1

| KEY SIZE | NUMBER OF STAGES | NUMBER OF TCAM ENTRIES FOR BRANCH 1 |
|---|---|---|
| 148 | 1 | 2160 |
| 104 | 2 | 93 |
| 116 | 2 | 192 |
| 64 | 3 | 39 |
| 52 | 4 | 32 |

TABLE 3

NUMBER OF TCAM ENTRIES FOR BRANCH 2

| KEY SIZE | NUMBER OF STAGES | NUMBER OF TCAM ENTRIES FOR BRANCH 2 |
|---|---|---|
| 148 | 1 | 1440 |
| 104 | 2 | 78 |
| 116 | 2 | 132 |
| 64 | 3 | 34 |
| 52 | 4 | 31 |

TABLE 4

NUMBER OF TCAM ENTRIES FOR BRANCH 3

| KEY SIZE | NUMBER OF STAGES | NUMBER OF TCAM ENTRIES FOR BRANCH 3 |
|---|---|---|
| 148 | 1 | 1152 |
| 104 | 2 | 72 |
| 116 | 2 | 108 |
| 64 | 3 | 32 |
| 52 | 4 | 30 |

TABLE 5

NUMBER OF TCAM ENTRIES FOR BRANCH 4

| KEY SIZE | NUMBER OF STAGES | NUMBER OF TCAM ENTRIES FOR BRANCH 4 |
|---|---|---|
| 148 | 1 | 576 |
| 104 | 2 | 60 |
| 116 | 2 | 60 |
| 64 | 3 | 28 |
| 52 | 4 | 28 |

TABLE 6

NUMBER OF TCAM ENTRIES FOR BRANCH 5

| KEY SIZE | NUMBER OF STAGES | NUMBER OF TCAM ENTRIES FOR BRANCH 5 |
|---|---|---|
| 148 | 1 | 144 |
| 104 | 2 | 51 |
| 116 | 2 | 24 |
| 64 | 3 | 25 |
| 52 | 4 | 26 |

It is to be understood that FIGS. 7A and 7B are merely one example of a search tree. Many other search trees may be implemented, and such search trees may have more or less than 5 branches. Similarly, Tables 1-6 list mere examples of key sizes, numbers of stages and numbers of TCAM entries. It is to be understood that different key sizes, numbers of stages and/or numbers of TCAM entries may be implemented.

Figure 8:
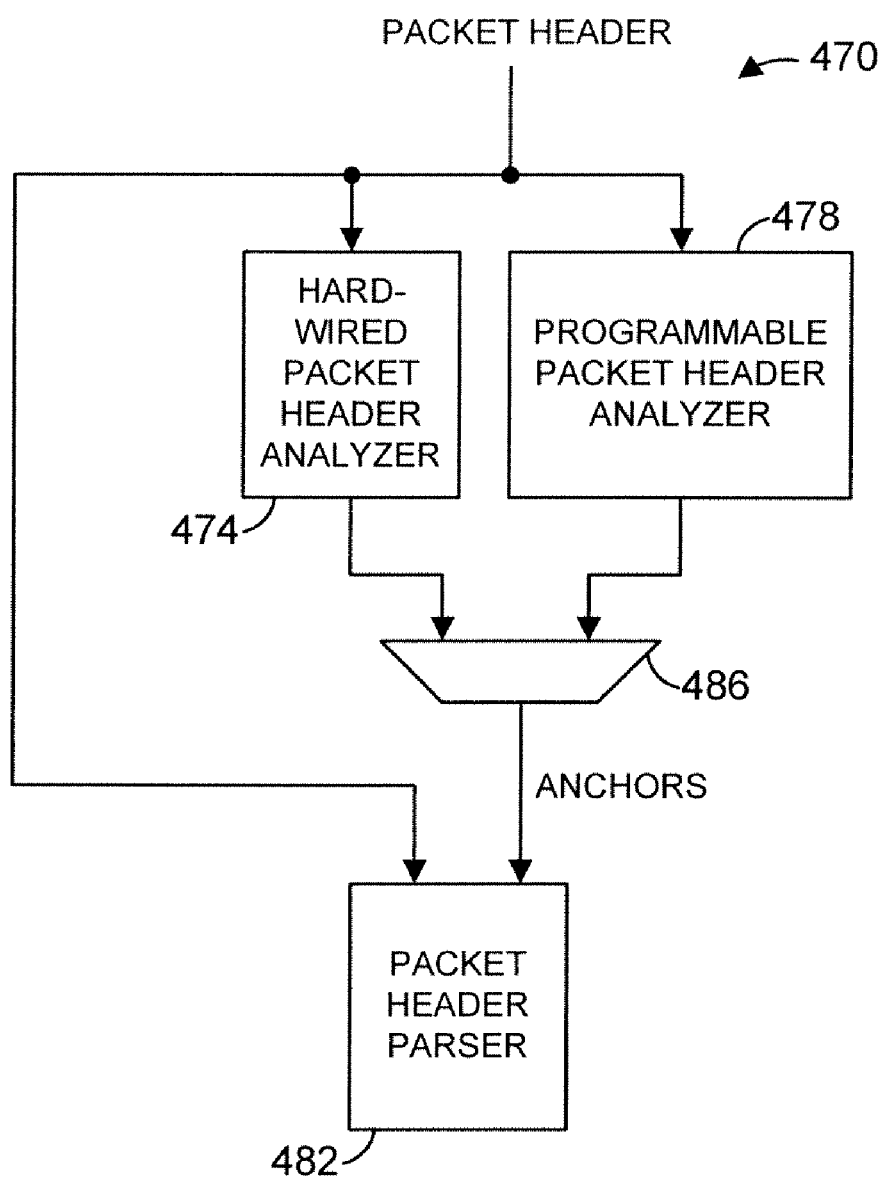
FIG. 8 is a block diagram of another example a packet processor.

FIG. 8 is a block diagram of another example packet processor 470 for parsing a packet or a portion of a packet. The packet or portion of the packet to be parsed may be received via a transmission over a point-to-point communication link, a network such as a wired local area network (LAN), a wireless LAN, a wide area network (WAN), a broadband wireless network, a cellular network, etc. In one particular implementation, the packet processor 470 may parse UDP packets. Of course, in other implementations one or more other types of packets may additionally or alternatively be parsed by the packet processor 470.

The packet processor 470 includes a first packet header analyzer 474 and a second packet header analyzer 478 communicatively coupled to a packet header parser 482. The first packet header analyzer 474 may be, for example, a packet header analyzer such as a prior art packet header analyzer, whereas the packet header analyzer 478 may be, for example, a packet header analyzer the same as or similar to the packet header analyzer 154 of FIG. 2. The packet header parser 482 may be a packet header parser such as the packet header parser 158 of FIG. 2.

The first packet header analyzer 474 and the second packet header analyzer 478 may be communicatively coupled to the packet header parser 482 via a multiplexer 486. Thus, the packet header parser 482 may receive anchor information from either of the first packet header analyzer 474 and the second packet header analyzer 478. In operation, the first packet header analyzer 474 may analyze packet headers to identify anchors (e.g., UDP anchors) in the packet headers, and may provide anchor information to the packet header parser 158. The first packet header analyzer 474 may not, however, be configured to analyze all packet types and/or packet header field information. The first packet header analyzer 474 may be "hardwired" and thus it may be difficult and/or require development, testing, etc. effort to modify it to handle new packet types, for example.

The second packet header analyzer 478 may be capable of analyzing packet types and/or packet header field information that the first packet header analyzer 474 cannot. Additionally, because the second packet header analyzer 478 may be of a form such as the packet header analyzer 200 of FIG. 3, it may be relatively easier (as compared to the first packet header analyzer 474) to configure it to handle new packet types, for example. Optionally, it may even be possible to reconfigure the second packet header analyzer 478 "in the field" via firmware update, for example. In particular, data in the TCAM and/or the packet parameters database could be updated.

Thus, if the first packet header analyzer 474 is able to analyze a packet header, the multiplexer 486 may be controlled so that anchor information generated by the first packet header analyzer 474 is provided to the packet header parser 482. On the other hand, if the first packet header analyzer 474 is unable to analyze a packet header, but the second packet header analyzer 478 is able to analyze the packet header, the multiplexer 486 may be controlled so that anchor information generated by the second packet header analyzer 474 is provided to the packet header parser 482. The first packet header analyzer 474 may generate a signal that indicates that it is unable to analyze a packet header, and this signal may be used to control the multiplexer 486 or to generate a signal to control the multiplexer 486, for example.

As discussed above, in one implementation the packet processor 470 may parse UDP packets. In this implementation, the packet header may be analyzed in a multi-stage approach in which each stage involves providing a 64-byte portion to the TCAM. For each stage after the first stage, the start point of the 64-byte portion may be indicated by the previous stage's search results. Similarly, for each stage after the first stage, a lookup ID may be indicated by the previous stage's search results.

In the first stage of this implementation, the first 64-bytes of the packet header may be provided to the TCAM. Optionally, the MAC destination address and/or the MAC sender address may be omitted to permit a deeper inspection. In other words, instead of providing the first 64-bytes of the packet header to the TCAM, the first 64-bytes after the MAC destination address and/or the MAC sender address may be provided to the TCAM in the first stage.

It is to be understood that the implementation described with reference to FIG. 8 is merely one particular implementation, and that many other different implementations are contemplated. For example, a different key size may be utilized, a single-stage analysis may be utilized, etc. Also, other implementations may be utilized for analyzing packets other than UDP packets.

Various types of packets may be analyzed using the above-described techniques. For example, packets such as IP packets, UDP packets, MAC in MAC packets, MPLS over IP, IPvX over IPv6, etc.

Although examples described above related to the analysis of packets, in other implementations other types of data units besides packets could be analyzed. Also, although examples described above related to data units received from a communication medium, in other implementations the data units that are to be analyzed may be received from a storage medium such as a random access memory (RAM), a FLASH memory, a magnetic tape, a compact disk (CD), a hard disk drive (HDD), a digital versatile disk (DVD), etc.

Figure 9A:
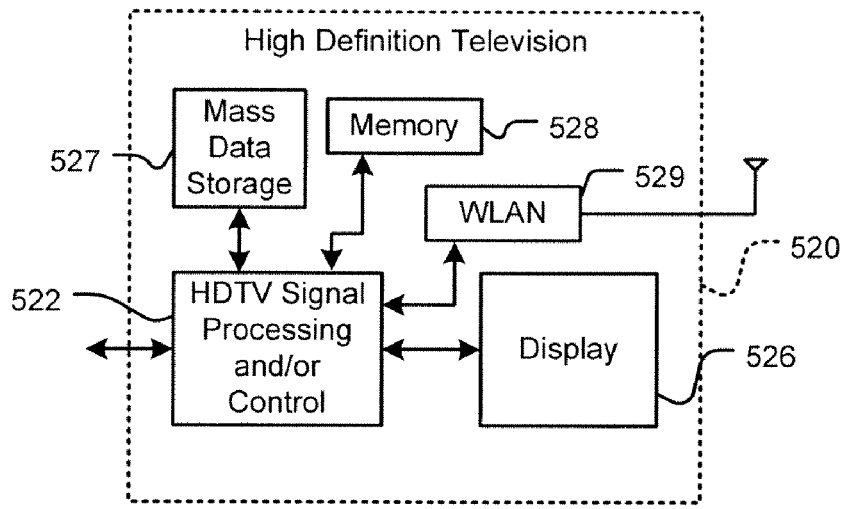
FIG. 9A is a block diagram of a high definition television that may utilize data unit analysis techniques such as described herein.

Header attribute information generation and parsing based on the header attribute information techniques such as described above (hereinafter "header attribute information generation") may be utilized in a variety of communication devices such as routers, firewalls, general purpose computers, wireless communication devices, set-top boxes, etc. Referring now to FIGS. 9A-9F, various example devices will be described that may utilize anchor information generation techniques such as described above. Referring to FIG. 9A, such techniques may be utilized in a high definition television (HDTV) 520. The HDTV 520 includes signal processing and/or control circuits, which are generally identified in FIG. 9A at 522, a WLAN interface 529, and a mass data storage 527. Header attribute information generation techniques may be utilized in the WLAN interface 529 or the signal processing circuit and/or control circuit 522, for example. HDTV 520 receives HDTV input signals in either a wired or wireless format and generates HDTV output signals for a display 526. In some implementations, signal processing circuit and/or control circuit 522 and/or other circuits (not shown) of HDTV 520 may process data, perform coding and/or encryption, perform calculations, format data and/or perform any other type of HDTV processing that may be required.

HDTV 520 may communicate with mass data storage 527 that stores data in a nonvolatile manner such as optical and/or magnetic storage devices. The mass data storage 527 may include one or more hard disk drives (HDDs) and/or one or more digital versatile disks (DVDs). One or more of the HDDs may be a mini HDD that includes one or more platters having a diameter that is smaller than approximately 1.8". HDTV 520 may be connected to memory 528 such as RAM, ROM, low latency nonvolatile memory such as flash memory and/or other suitable electronic data storage. HDTV 520 also may support connections with a WLAN via the WLAN network interface 529.

Figure 9B:
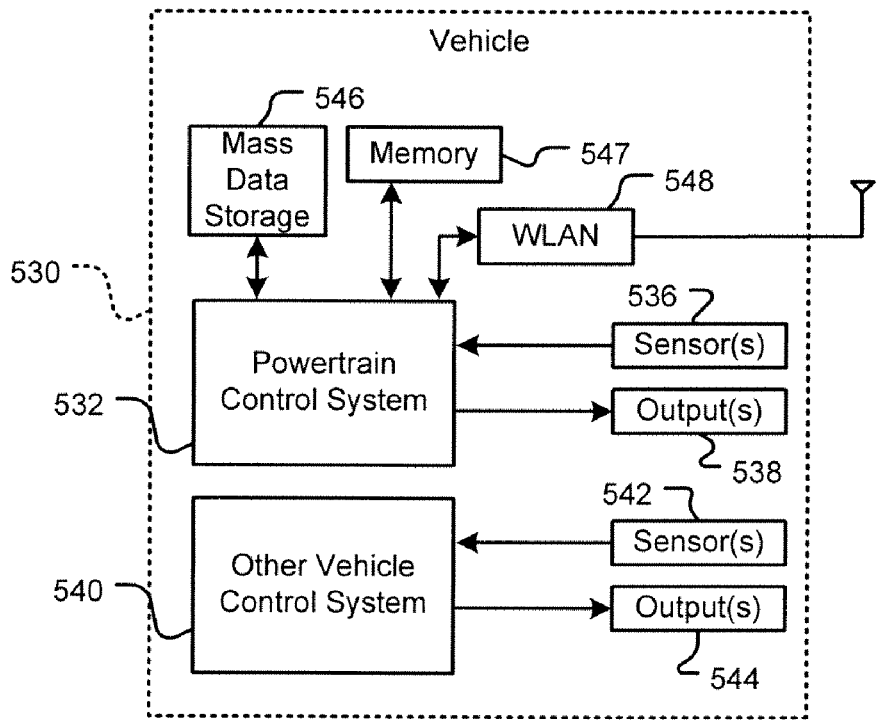
FIG. 9B is a block diagram of a vehicle that may utilize data unit analysis techniques such as described herein.

Referring now to FIG. 9B, header attribute information generation techniques such as described above may be utilized in a control system of a vehicle 530. In some implementations, a powertrain control system 532 receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

A control system 540 may likewise receive signals from input sensors 642 and/or output control signals to one or more output devices 544. In some implementations, control system 540 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

Powertrain control system 532 may communicate with mass data storage 546 that stores data in a nonvolatile manner. Mass data storage 546 may include optical and/or magnetic storage devices for example hard disk drives HDD and/or DVDs. One or more of the HDDs may be a mini HDD that includes one or more platters having a diameter that is smaller than approximately 1.8". Powertrain control system 532 may be connected to memory 547 such as RAM, ROM, low latency nonvolatile memory such as flash memory and/or other suitable electronic data storage. Powertrain control system 532 also may support connections with a WLAN via a WLAN network interface 548. Header attribute information generation techniques such as described above may be implemented in the WLAN interface 548. The control system 540 may also include mass data storage, memory and/or a WLAN interface (all not shown).

Figure 9C:
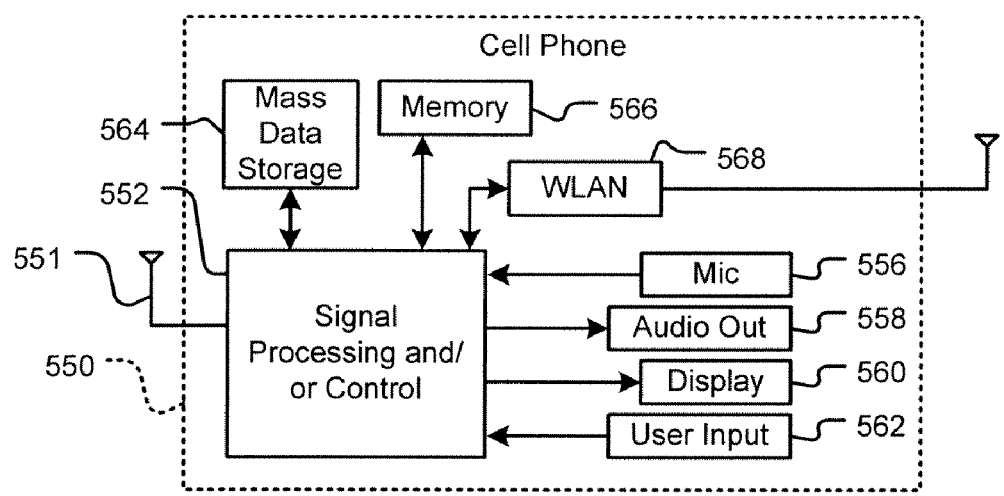
FIG. 9C is a block diagram of a cellular phone that may utilize data unit analysis techniques such as described herein.

Referring now to FIG. 9C, techniques such as described above may also be utilized in a cellular phone 550 that may include a cellular antenna 551. The cellular phone 550 includes signal processing and/or control circuits, which are generally identified in FIG. 9C at 552, a WLAN interface 568, and a mass data storage 564. Header attribute information generation techniques may be implemented in the signal processing and/or control circuits 552 and/or the WLAN interface 568, for example. In some implementations, cellular phone 550 includes a microphone 556, an audio output 558 such as a speaker and/or audio output jack, a display 560 and/or an input device 562 such as a keypad, pointing device, voice actuation and/or other input device. Signal processing and/or control circuits 552 and/or other circuits (not shown) in cellular phone 550 may process data, perform coding and/or encryption, perform calculations, format data and/or perform other cellular phone functions.

Cellular phone 550 may communicate with mass data storage 564 that stores data in a nonvolatile manner such as optical and/or magnetic storage devices for example hard disk drives HDD and/or DVDs. At least one HDD may be a mini HDD that includes one or more platters having a diameter that is smaller than approximately 1.8". Cellular phone 550 may be connected to memory 566 such as RAM, ROM, low latency nonvolatile memory such as flash memory and/or other suitable electronic data storage. Cellular phone 550 also may support connections with a WLAN via a WLAN network interface 568.

Figure 9D:
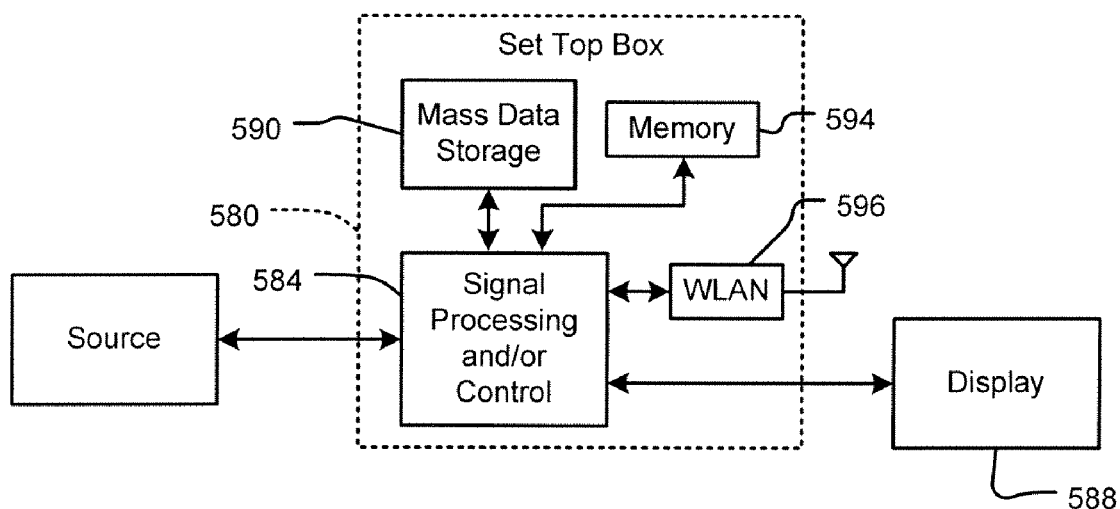
FIG. 9D is a block diagram of a set top box that may utilize data unit analysis techniques such as described herein.

Referring now to FIG. 9D, techniques such as described above may be utilized in a set top box 580. The set top box 580 includes signal processing and/or control circuits, which are generally identified in FIG. 9D at 584, a WLAN interface 596, and a mass data storage device 590. Header attribute information generation techniques may be implemented in the signal processing and/or control circuits 584 and/or the WLAN interface 596, for example. Set top box 580 receives signals from a source such as a broadband source and outputs standard and/or high definition audio/video signals suitable for a display 588 such as a television and/or monitor and/or other video and/or audio output devices. Signal processing and/or control circuits 584 and/or other circuits (not shown) of the set top box 580 may process data, perform coding and/or encryption, perform calculations, format data and/or perform any other set top box function.

Set top box 580 may communicate with mass data storage 590 that stores data in a nonvolatile manner. Mass data storage 590 may include optical and/or magnetic storage devices for example hard disk drives HDD and/or DVDs. At least one HDD may be a mini HDD that includes one or more platters having a diameter that is smaller than approximately 1.8". Set top box 580 may be connected to memory 594 such as RAM, ROM, low latency nonvolatile memory such as flash memory and/or other suitable electronic data storage. Set top box 580 also may support connections with a WLAN via the WLAN network interface 596.

Figure 9E:
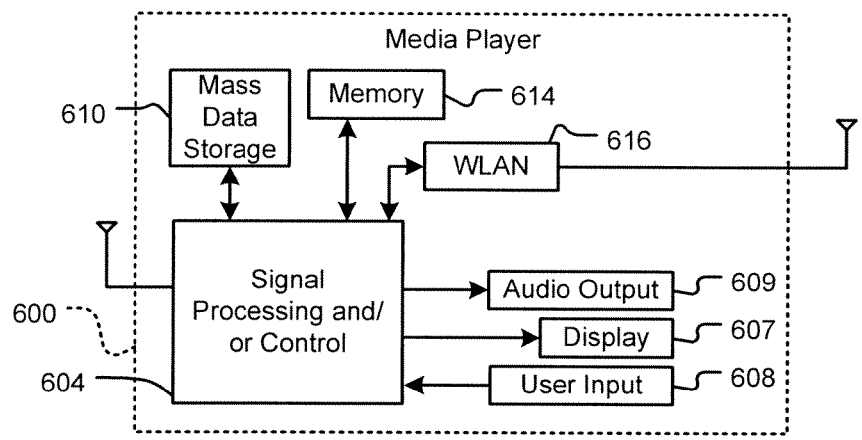
FIG. 9E is a block diagram of a media player that may utilize data unit analysis techniques such as described herein.

Referring now to FIG. 9E, techniques such as described above may be utilized in a media player 600. The media player 600 may include signal processing and/or control circuits, which are generally identified in FIG. 9E at 604, a WLAN interface 616, and a mass data storage device 610. Header attribute information generation techniques may be implemented in the signal processing and/or control circuits 604 and/or the WLAN interface 616, for example. In some implementations, media player 600 includes a display 607 and/or a user input device 608 such as a keypad, touchpad and the like. In some implementations, media player 600 may employ a graphical user interface (GUI) that typically employs menus, drop down menus, icons and/or a point-and-click interface via display 607 and/or user input device 608. Media player 600 further includes an audio output 609 such as a speaker and/or audio output jack. Signal processing and/or control circuits 604 and/or other circuits (not shown) of media player 600 may process data, perform coding and/or encryption, perform calculations, format data and/or perform any other media player function.

Media player 600 may communicate with mass data storage 610 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may be a mini HDD that includes one or more platters having a diameter that is smaller than approximately 1.8". Media player 600 may be connected to memory 614 such as RAM, ROM, low latency nonvolatile memory such as flash memory and/or other suitable electronic data storage. Media player 600 also may support connections with a WLAN via a WLAN network interface 616. Still other implementations in addition to those described above are contemplated.

FIG. 9E illustrates an antenna coupled to the signal processing and/or control circuits 604. The antenna may be a loop antenna, a whip antenna, headphone wires, a metal pad, a metal pad mounted on a device that so that, when worn, the metal pad will be in contact with a person's skin, etc.

Figure 9F:
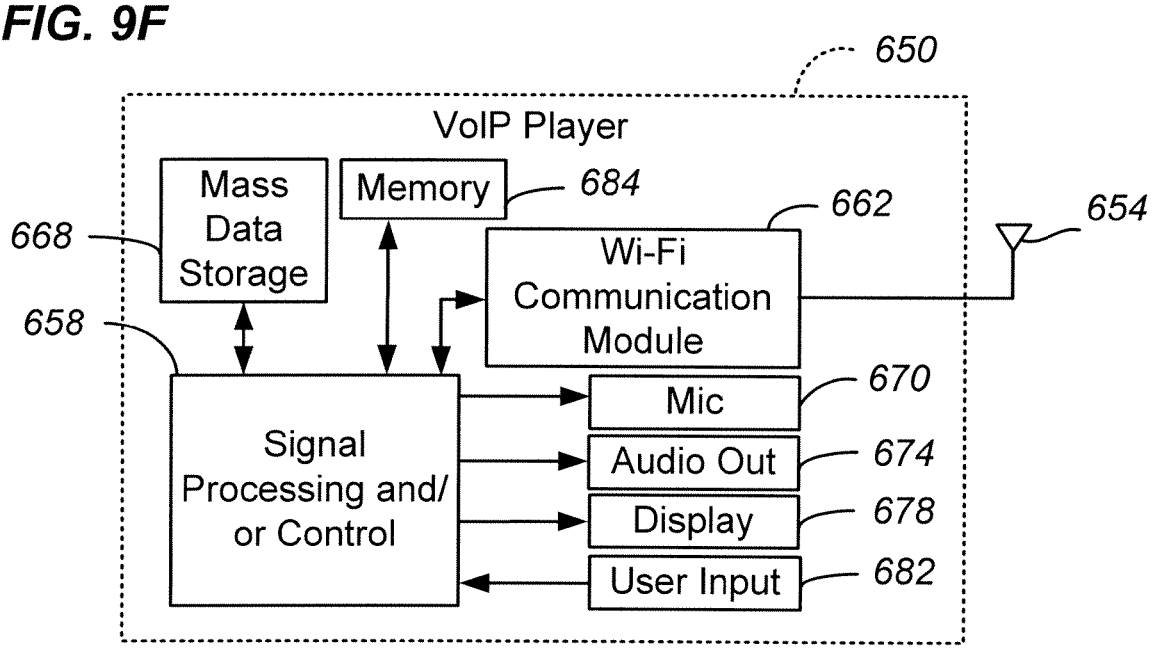
FIG. 9F is a block diagram of a voice over IP device that may utilize data unit analysis techniques such as described herein.

Referring to FIG. 9F, techniques such as described above may be utilized in a Voice over Internet Protocol (VoIP) phone 650 that may include an antenna 654, signal processing and/or control circuits 658, a wireless interface 662, and a mass data storage 668. Header attribute information generation techniques such as described above may be implemented in the signal processing and/or control circuits 658 and/or the wireless interface 662, for example. In some implementations, VoIP phone 650 includes, in part, a microphone 670, an audio output 674 such as a speaker and/or audio output jack, a display monitor 678, an input device 682 such as a keypad, pointing device, voice actuation and/or other input devices, and a Wireless Fidelity (Wi-Fi) communication module 662. Signal processing and/or control circuits 658 and/or other circuits (not shown) in VoIP phone 650 may process data, perform coding and/or encryption, perform calculations, format data and/or perform other VoIP phone functions.

VoIP phone 650 may communicate with mass data storage 668 that stores data in a nonvolatile manner such as optical and/or magnetic storage devices, for example hard disk drives HDD and/or DVDs. The HDD may be a mini HDD that includes one or more platters having a diameter that is smaller than approximately 1.8". VoIP phone 650 may be connected to memory 684, which may be a RAM, ROM, low latency nonvolatile memory such as flash memory and/or other suitable electronic data storage. VoIP phone 650 is configured to establish communications link with a VoIP network (not shown) via Wi-Fi communication module 662.

At least some of the various blocks, operations, and techniques described above may be implemented in hardware, firmware, software, or any combination of hardware, firmware, and/or software. As just one example, the controller 212 (FIG. 3) may be implemented using hardware, firmware, software, or any combination of hardware, firmware, and/or software. When implemented in software or firmware, the software or firmware may be stored in any computer readable memory such as on a magnetic disk, an optical disk, or other storage medium, in a RAM or ROM or flash memory, processor, hard disk drive, optical disk drive, tape drive, etc. Likewise, the software or firmware may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware may include machine readable instructions that are capable of causing one or more processors to perform various acts. Also, the firmware may include data to be stored in a TCAM and/or other storage device such as a packet parameters database.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

What is claimed is:

1. An apparatus, comprising:
a header analyzer unit configured to generate attribute information regarding headers of a data unit, the generated header attribute information for use in parsing the data unit, wherein the header analyzer unit comprises:
a programmable memory unit including
a content addressable memory (CAM) having an input to receive a first portion of the data unit and a second portion of the data unit; and
a memory separate from the CAM and coupled to an output of the CAM, wherein the memory separate from the CAM is to programmably store header attribute information regarding a plurality of different types of headers for data units having different formats;
wherein the CAM stores indications of locations within the memory separate from the CAM; the apparatus further comprising:
an interface coupled to the input of the CAM, wherein the interface is controllable to couple selected portions of the data unit to the input of the CAM;
a controller coupled to the output of the CAM and an input of the memory separate from the CAM, wherein the controller is configured to
control the interface to couple the first portion of the data unit to the input of the CAM;
use an output of the CAM corresponding to the first portion of the data unit to retrieve from the memory separate from the CAM an indication of a second portion of the data unit;
control the interface to couple the second portion of the data unit to the input of the CAM; and
use an output of the CAM corresponding to the second portion of the data unit to retrieve from the memory separate from the CAM header attribute information.

2. An apparatus according to claim 1, wherein the attribute information comprises indications of locations of fields in the header, indications of the types of fields, indications of validity of the fields, indications of a priority of the data unit, an indication of a number of IEEE 802.1Q tags, an indication of a number of MPLS labels, or an indication of a number of VLAN tags.

3. An apparatus according to claim 1, wherein the generated header attribute information comprises an indicator of a location of a field in the header, wherein the indicator of the location of the field in the header comprises an offset from a start or an end of the data unit, or an offset from another field in the data unit.

4. An apparatus according to claim 1, wherein the CAM is a ternary CAM.

5. An apparatus according to claim 1, wherein the CAM comprises at least a first segment and a second segment, wherein the first segment and the second segment are separately activatable;
wherein the first segment corresponds to the first portion of the data unit; and
wherein the second segment corresponds to the second portion of the data unit.

6. An apparatus according to claim 1, wherein the first portion of the data unit and the second portion of the data unit are the same size.

7. An apparatus according to claim 1, wherein the first portion of the data unit and the second portion of the data unit are different sizes.

8. An apparatus according to claim 1, wherein at most one entry in the programmable memory unit corresponds to the data unit coupled to the input of the programmable memory unit.

9. An apparatus according to claim 1, wherein a plurality of entries in the programmable memory unit corresponds to the data unit coupled to the input of the programmable memory unit.

10. An apparatus according to claim 1, wherein the data unit is a packet header.

11. An apparatus, comprising:
a header analyzer unit configured to generate attribute information regarding headers of a data unit, the generated header attribute information for use in parsing the data unit, wherein the header analyzer unit comprises:

a content addressable memory (CAM) including
an input to receive portions of the data unit,
a first segment, and
a second segment;
wherein the first segment and the second segment are separately activatable; and
a memory separate from the CAM and coupled to an output of the CAM, wherein the memory separate from the CAM is to programmably store header attribute information regarding a plurality of different types of headers for data units having different formats;
wherein the CAM stores indications of locations within the memory separate from the CAM; the apparatus further comprising:
an interface coupled to the input of the CAM, wherein the interface is controllable to couple selected portions of the data unit to the input of the CAM;
wherein the first segment of the CAM corresponds to a first selected portion of the data unit; and
wherein the second segment of the CAM corresponds to a second selected portion of the data unit.

12. An apparatus according to claim 11, wherein the attribute information comprises indications of locations of fields in the header, indications of the types of fields, indications of validity of the fields, indications of a priority of the data unit, an indication of a number of IEEE 802.1Q tags, an indication of a number of MPLS labels, or an indication of a number of VLAN tags.

13. An apparatus according to claim 11, wherein the generated header attribute information comprises an indicator of a location of a field in the header, wherein the indicator of the location of the field in the header comprises an offset from a start or an end of the data unit, or an offset from another field in the data unit.

14. An apparatus according to claim 11, further comprising a controller coupled to the output of the CAM and an input of the memory separate from the CAM, wherein the controller selects memory locations in the memory separate from the CAM based on the output of the CAM.

* * * * *